Patented Feb. 27, 1945

2,370,610

UNITED STATES PATENT OFFICE 2,370,610

MANUFACTURE OF FERROMANGANESE

Pierre Adeline, Sidcup, England, assignor to Thermoloys Limited, London, England, a British company No Drawing. Application May 18, 1942, Serial No. 443,497. In Great Britain April 1, 1941

7 Claims. (Cl. 75—27)

This invention relates to the alumino-thermic production of carbon-free ferro-manganese by mixing manganese ores with aluminum and igniting the mixture. As long ago as 1905 Goldschmidt and Weil stated that when manganese oxides of the lowest degree of oxidation were used the yield was low and that oxides with a higher degree of oxidation led to too quick a reaction, and to get over this difficulty they proposed to use a small quantity of a higher oxide for securing a quick reaction and a large quantity of a lower oxide to cause the reaction to take place harmlessly. Despite this proposal, however, ferro-manganese has not been successfully produced on a commercial scale by the alumino-thermic process. One of many contributory causes has undoubtedly been that finely divided aluminum, which Goldschmidt thought it necessary to use, is very expensive.

Extensive researches have shown that the most important problem is to control the reaction, because if it is too violent manganese is lost by volatilisation and there is inadequate separation of metal from the slag also causing loss of metal. On the other hand if there is too little oxygen present the reaction will not proceed at all. I have found by experiment that the nature and condition of the reagents is extremely important, and that the composition and melting point of the slag are equally important in ensuring efficient separation of the metal from the slag.

The primary object of this invention is to provide a process by which ferro-manganese can be produced alumino-thermically from an ore on a commercial scale with a good yield.

Another object of the invention is to reduce the loss of manganese in the alumino-thermic reduction of a manganese-containing ore.

A further object of the invention is to produce a very fluid slag that will ensure good separation of the metal.

An important feature of my invention is the use of coarse aluminum in the form of turnings, borings and swarf generally, that is to say, scrap aluminum.

At the present time, apart from all the usual forms such as sheet or strip, there are three kinds of aluminum available on the market, namely, powder, granules and swarf. Powder is produced by special process, e. g. subjecting liquid aluminum to the action of compressed air; granules are produced by pulverizing ingots or other large forms and are usually up to 3 mm. in size; and swarf is waste from machine shops and is the cheapest of all. In the present process it is swarf that is used. The term "swarf" embraces its general significance in the art, including scrap aluminum as it generally occurs in machine shops, such as borings, turnings, and the like. Where the turnings for example are in the form of long coils, it will be apparent that they may be subjected to being broken up in accordance with the usual prevailing coarse particle size of swarf. Hitherto it has generally been thought necessary to use finely divided aluminum in order to obtain the necessary speed of reaction. By using coarse aluminum I not only cheapen the process considerably but also assist materially in controlling the reaction. I have found by experiment that the amount of oxygen in the mixture is a matter of importance, and that the desired amount can be obtained by roasting an ore consisting essentially of manganese dioxide. The ore should be roasted until its oxygen content corresponds to an $Mn_3O_4$ content of from 75 to 85%, approximating an oxygen content substantially 29.5%. The ore is usually in the form of small pieces, about the size of chestnuts or walnuts, and I roast it until it becomes brown or chocolate in colour. When the roasted ore is subsequently crushed the cores of the small pieces, consisting of the unconverted black dioxide, serve to impart a black colour to the ore again. The roasting may take place in a rotary or reverberatory furnace for from 30 to 40 minutes with a flame that serves to heat the ore to a temperature in the order of 900° C. This is a quick and cheap process.

If such a crushed ore were used with finely divided aluminum, the mixture would explode on ignition. Even when coarse aluminum is used I find that the reaction must be controlled to ensure that manganese is not lost by volatilization. Accordingly I also regulate the proportions of the constituents of the mixture and the rate of feeding so that the temperature does not rise above 1900° C. and preferably is maintained between 1700 and 1800° C.

The upper temperature limit above specified is of special significance in that it serves to minimize the silicon content of the final product, with the added advantage that the life of the crucible within which the reaction takes place is prolonged. If no special steps were taken, much of the silica in the ore or from the crucible lining would be converted to silicon, thereby undesirably contaminating the ferro-manganese. The reaction temperature may be further regulated by the rate in which the material is fed to the reaction zone; desirably only a comparatively small quantity of the reagent mixture is supplied at a time.

As will be seen, the optimum working temperature comprises a range of reasonable latitude embracing a lower value of approximately 1700° C., representing a practical degree of fluidity of the metal, and an upper value of approximately 1900° C., which serves to minimize the silicon content of the ferro-manganese produced and the loss of manganese by volatilization. Measurement of the actual temperature in the crucible by instruments is difficult, but a simple and practical means of keeping the temperature within the required range is to regulate the rate of feeding of the materials (a) so that a steady reaction is maintained, and (b) so that the smoke rising from the crucible is white or greyish-white in color. Any black or blackish-brown smoke betokens the presence of manganese in the fumes and an unduly high temperature, when the rate of feeding can be retarded until the smoke becomes white or grey again. In view of the substantial proportion of slag forming material utilized under optimum conditions of operation, as disclosed herein below, a covering of slag occurs on the top of the molten metal, resulting in precluding undue atmospheric oxidation. This layer of slag grows in thickness with each additional charge and some of it is run off from time to time during the reaction, but a layer of, say, 1" or 2" of slag should always be retained up to the final complete deslagging prior to pouring. When the slag has thus been reduced to a thin hot layer, there may be a momentary puff of black smoke from the next partial charge deposited on it. This can be disregarded, but anything in the nature of a continuous or heavy discharge of black or brown smoke should be avoided. For any given mixture the correct rate of charging can thus be easily regulated, but if any change is made in the reacting materials, such as the use of a different grade of aluminum, or of aluminum or oxide of a smaller granular size, leading to a general rise in temperature, it may be found necessary or preferable to rectify this by increasing the amount of lime in the mixture, rather than by altering the rate of charging. Or both remedies can be applied together.

The mixture must also include slag-forming materials, and these should be chosen so that they deaden the reaction both by separating the highly reactive materials from one another and by absorbing heat, and also make the slag fluid. I prefer to use lime, because this is an excellent slag-forming material and is cheap. The form of slaked lime known as "hydralime" is particularly suitable because of its purity. I can, however, add the lime in the form of a reducible compound such as calcium sulphate, or instead of lime I may use such materials as barium oxide or barium sulphate.

The ratio of ore to aluminum depends upon the exact ore used and the purity of the aluminum, but with an ore roasted as described above a suitable ratio is about 3.8:1.

Lime has previously been used as a slag-forming ingredient in exothermic processes. I find it desirable to use a higher proportion of lime than usual, e. g. from 15 to 20% by weight of the ore. This high proportion of lime increases the bulk of the mixture and, by its bad conductivity for heat while separating the grains of the reaction and absorbing much heat in melting, it serves to keep the reaction temperature low and the reaction under control, so that there is time for all the aluminum to react.

I find that it is desirable to include in the mixture a reagent which will react quickly with the aluminum and thus give initial force to the reaction. For this purpose I use an alkali metal nitrate or chlorate, which has the added advantage of increasing the fluidity and lowering the melting point of the slag; these materials react with aluminum at a lower temperature than with manganese oxide. In addition I ordinarily include a flux, which may advantageously be fluorspar, as is usual in metallurgical processes. A small quantity of sodium carbonate may be used to assist in the removal of silica present in the mixture into the slag in the form of silicates. It is not possible to give precise limits for the amount of nitrate or chlorate, sodium carbonate and fluorspar that should be used, because this depends upon the amount of gangue in the ore being treated. The best amount to use has to be determined by experiment. It may, in some cases, be as low as 2% by weight of the ore being treated, and in others as high as 10%.

The resultant slag can be run off in the liquid state and if it is run off into cold water, it is found that it breaks up to a particle size approximating to that of river sand. In this form, it can be very easily treated for the recovery of the alumina contained in it.

It is desirable to add the mixture to a crucible in stages, that is to say, to start the reaction with some of the mixture and then to add further quantities. This procedure assists in preventing the reaction temperature from becoming too high.

The importance of controlling the melting point of the slag has been noted hereinabove. With the above method of continuously charging the materials into the reaction zone, it is advantageous to have a slag of comparatively low melting point, so that as the crucible fills up, the floating slag may be poured off in its liquid state. Moreover a high melting-point slag leads to a high silicon content of the ferro-manganese, and to remedy this the melting point of the slag should be kept under 1900 degrees C. No further additions to the charge, however, are necessary for this purpose, since a secondary effect of the sodium carbonate, as well as the nitrate or chlorate of potassium or sodium, already included in the mixture, is to reduce the melting point of the slag, and the quantity of these materials used is simply regulated so as to reduce the melting point of the slag to 1900 degrees C. or under. The quantity to be used, as already stated, depends on the amount of gangue in the ore so that no hard and fast rules can be laid down. It is not likely, however, to exceed 10% of the weight of ore.

As an example, a Dongri ore consisting mainly of manganese dioxide and containing 50% manganese, 6% iron and 5% silicon was coarsely crushed, then mixed with about 4% by weight of carbonaceous matter in the form of coke, and heated for 30 minutes in a rotary furnace, the flame giving about 1200° C. and the mixture rising to 900° C. It was then passed to a ball mill and crushed to a fineness such that from 50 to 60% of it was under $\frac{1}{32}$ of an inch in size, from 20 to 30% of it was under $\frac{1}{8}$ of an inch and the remainder under $\frac{1}{4}$ of an inch.

The aluminum used consisted of aluminum turnings containing 90% aluminum. These were heated so as to remove oil, grease and dirt and to dry them. The heating resulted in the turnings being broken up. They were then passed to a magnetic separator for the removal of particles of iron.

The other ingredients of the mixture were "hydralime" and a composition made up from 15 lbs. of anhydrous potassium nitrate, 56 lbs. of fluorspar and 0.5 lb. of sodium carbonate.

The mixture was made as follows:

| | Pounds |
|---|---|
| Ore | 820 |
| Aluminum | 270 |
| Hydralime | 150 |
| Mixture of potassium nitrate, sodium carbonate and fluorspar | 25 |

When this mixture was ignited a reaction ensued in which the temperature never rose so high that any considerable amount of manganese was volatilized, and as a result of the reaction 450 lbs. of carbon-free ferro-manganese were obtained having the following composition:

| | Per cent |
|---|---|
| Manganese | 79.4 |
| Iron | 15.8 |
| Silicon | 3.3 |
| Phosphorus | 0.21 |
| Aluminum | 0.20 |

By passing the ore coming from the ball mill through a magnetic separator, but proceeding otherwise in the manner set out above, it was found that the manganese content of the final product was increased by 3.8% and the iron content decreased by 3.5%.

I claim:

1. The method of making ferro-manganese which comprises reacting coarse particles of a manganiferous material containing iron with coarse particles of aluminum, and maintaining said reaction at a temperature below 1900 degrees C., by the presence of approximately 15% to 20% of slag forming material from the group consisting of calcium and barium oxides and sulphates, the said manganiferous material containing approximately 75% to 85% of $Mn_3O_4$ with the remainder being higher oxides of manganese.

2. The method of making ferro-manganese which comprises mixing coarse particles of a manganiferous material containing iron with coarse particles of scrap aluminum and with a slag forming material, and reacting the said mixture, the proportion of the slag forming material being sufficient to maintain the reaction temperature below 1900 degrees C., the said manganiferous material containing approximately 75% to 85% of $Mn_3O_4$ with the remainder being higher oxides of manganese.

3. The method as in claim 2 wherein the slag forming material is a substance from the group consisting of alkaline earth hydroxides and sulphates.

4. The method as in claim 2 wherein the slag forming material is hydrated lime.

5. The method of making ferro-manganese which comprises mixing coarse particles of a manganiferous material containing iron with coarse particles of scrap aluminum, slag forming material, a substance which reacts with aluminum at a temperature lower than with manganese oxide and reduces the melting point of the slag, and a flux reagent, the proportion of the slag forming material being sufficient to maintain the reaction temperature below 1900 degrees C., the said manganiferous material containing approximately 75% to 85% of $Mn_3O_4$ and resulting from the reduction of $MnO_2$ ore.

6. The method of making ferro-manganese which comprises mixing coarse particles of a manganiferous material containing iron with coarse particles of scrap aluminum, adding to the mixture a substantial proportion of hydrated lime and a minor proportion of potassium chlorate, fluorspar, and sodium carbonate, the proportion of the reagents in admixture being sufficient to maintain the temperature below approximately 1900 degrees C., the said manganiferous material containing approximately 75% to 85% of $Mn_3O_4$ and resulting from the reduction of an $MnO_2$ ore.

7. The method of making ferro-manganese which comprises mixing coarse particles of a manganiferous material containing iron with coarse particles of scrap aluminum, hydrated lime, potassium chlorate, fluorspar, and sodium carbonate, and reacting the said mixture, the proportion of the said lime being between approximately 15% and 20% by weight of the manganiferous material and sufficient to maintain the temperature below approximately 1900 degrees C., the content of potassium chlorate, fluorspar and sodium carbonate being between approximately 2% and 10% of the manganiferous material, the said manganiferous material containing approximately 75% to 85% of $Mn_3O_4$ and resulting from the reduction of an $MnO_2$ ore.

PIERRE ADELINE.